United States Patent [19]

McKee et al.

[11] Patent Number: 4,893,351

[45] Date of Patent: Jan. 9, 1990

[54] COMMUNICATION RECEIVER HAVING A REMOTE ALERT DEVICE

[75] Inventors: John M. McKee, Coral Springs; Marilyn S. Burger, Pompano, both of Fla.

[73] Assignee: Motorola, Inc., Schaumburg, Ill.

[21] Appl. No.: 92,092

[22] Filed: Sep. 2, 1987

[51] Int. Cl.[4] .......... H04B 1/08

[52] U.S. Cl. .......... 455/347; 455/351; 340/311.1; 439/11

[58] Field of Search .......... 340/311.1, 825.46, 407; 455/228, 347, 351, 344; 439/13, 18, 20, 21, 23, 28, 578, 308, 322, 348, 349, 350

[56] References Cited

U.S. PATENT DOCUMENTS

| | | | |
|---|---|---|---|
| 2,582,277 | 1/1952 | Powlison | 340/407 |
| 2,626,975 | 1/1953 | Rockwell et al. | 439/350 |
| 3,618,070 | 11/1971 | Kagan | 340/825.46 |

*Primary Examiner*—Robert L. Griffin
*Assistant Examiner*—Ralph Smith
*Attorney, Agent, or Firm*—Vincent B. Ingrassia; Anthony J. Sarli, Jr.

[57] ABSTRACT

An apparatus for generating a remote alert signal in a communication receiver, the apparatus includes a remote alerting device, a latching receptacle enclosed within a casing of the receiver, and an electrical connector cable. The latching receptacle includes a socket accessible from outside the casing and a locking means comprised of a resilient means and an actuating means. The connector cable terminates at one end with the alerting device and at the other end with an electrical connector in the form of a mating plug having a groove extending around the periphery of the plug. The mating plug inserts into the socket and the resilient means being normally biased into the groove prevents disengagement of the mating plug. To release the plug, the actuating means forces the resilient means out of said groove to permit the mating plug to separate from the socket. The connector cable provides electrical communication between the receiver and the alert device. Additionally, the combination of the groove and resilient means allows the mating plug to be rotatable to prevent twisting in the connector cable.

19 Claims, 6 Drawing Sheets

CC

DD

DD

COMMUNICATION RECEIVER HAVING A REMOTE ALERT DEVICE

BACKGROUND OF THE INVENTION

1. Field of the Invention

The present invention relates to communication receivers and in particular to a method and apparatus for generating a remote alert signal in a personal portable paging receiver.

2. Background Discussion

Communication systems in general and paging systems in particular using transmitted call signals have attained widespread use for calling selected receivers to transmit information from a base station terminal to the receiver. Briefly, a simple paging receiver includes a receiver, a decoding unit, and alert circuitry. The receiver receives selective calling message signals while the decoding unit assures that only selective calling messages intended for the particular paging receiver are processed by the paging receiver. In response to decoding information intended for the paging receiver, the alert circuitry alerts the user that a selective calling message is received. This is accomplished by activating one of a plurality of alert annunciators such as a light, a speaker, or a vibratory means to produce an alert signal to notify the user of a received message.

Due to the versatility of paging receivers, the population of paging receivers has increased dramatically within the last several years. Since a growing percentage of the pager user population is the business user, a difficulty has arisen due to the type of wearing apparel. Traditionally, a belt worn paging receiver as disclosed in U.S. Pat. No. 4,635,836 has shown great popularity. However, with the increase of paging receivers into the business community, paging receiver manufacturers have been providing smaller paging receiver units with user option removable belt clips or pocket watch style lanyards which clip the pager to the user's apparel. Typical of the pocket watch style lanyard is Motorola's lanyard manufactured under their designation NRN4916A. These type of lanyards have a clip on one end with the paging receiver attached to the other end. In practice, the clip is typically attached to a belt loop or pocket with the paging receiver being placed in the pocket or the like. Unfortunately, the use of these pocket watch style lanyards has often resulted in the alert signal, generated by the paging receiver, to be obstructed by the apparel of the user. In particular, for a vibration alert, the tactile sensation being transmitted in the paging receiver to the user has been less than adequate due to the low or absence of physical coupling to the paging receiver user. This has also been a significant drawback for those paging receiver users in high ambient noise areas or non-intrusive noise areas for which vibratory annunciation is the only viable option for notification.

Furthermore, the vibratory annunciation mechanism has always been included in the paging receiver device which has restricted the reduction in size of the paging receiver. Therefore, it would be desirable to have an alerting device being physically separated from the paging receiver while remaining responsive to the alert circuitry of the paging receiver. Ideally, the alerting device is attached to a location on the user which enhances the detectability of the alert signal. However, one problem with a remote alerting device is accidentally severing the communication channel between the alerting device and the paging receiver, thus resulting in lost communication between the alerting device and pager. This is extremely undesirable since the paging user will lose the major function of the paging receiver, namely the alert capability. Another problem arises when the communication channel takes the form of an electrical cable between the alerting device and paging receiver. In this instance, the kinking and twisting of the cable is very uncomfortable and undesirable.

SUMMARY OF THE INVENTION

It is therefore an object of the present invention to overcome the problems of the prior art paging receivers by providing a remote alerting device being separated from the paging receiver while remaining responsive to the paging receiver.

It is another object of the present invention to provide an apparatus and method for electrically connecting a remote alerting device to a paging receiver that can be easily and quickly removed by the paging receiver user.

Another object of this invention is to provide a rotatable electrical connector to prevent twisting and kinking of the electrical connection, but yet can be securely locked into the paging receiver.

These as well as other objects and advantageous features of the present invention will be apparent and in part pointed out hereinafter.

In general, an apparatus and method for providing a remote alerting signal from a paging receiver includes a remote alerting device, a connector cable, and a latching receptacle included in the paging receiver. The alerting device includes an annunciating device such as a light, speaker, or vibration means. The connector cable terminates at a first end with the alerting device and terminates at a second end with a removable electrical connector in the form of a mating plug. The latching receptacle includes a socket for engaging the mating plug and a locking means. The mating plug inserts firmly into the socket and securely fastens to the paging receiver by actuating the locking means. The locking means prevents the mating plug from accidentally separating from the socket. To release the mating plug, the user actuates the locking means to disengage the mating plug from the socket. The socket and locking means further permit the mating plug to freely rotate to prevent twisting of the cable.

In particular, the paging receiver, being enclosed in a casing, includes alert circuitry for generating an electrical signal in response to the receipt of a selective call message. The socket being accessible to the mating plug from the outside of the casing includes socket contacts operatively coupled to the alerting circuitry for transmitting the electrical signal. The removable electrical connector being engaged within the socket includes first electrical contacts slidably engaging the socket contacts to permit rotation of the electrical connector relative to the socket while maintaining electrical connection therebetween. The connector cable includes cable conductors connected to the first electrical contacts to transmit the electrical signal from the alert circuitry to the alerting device. The alerting device includes second electrical contacts being electrically coupled to the cable conductors to transmit the electrical signal to the alerting device.

BRIEF DESCRIPTION OF THE DRAWINGS

The foreground objectives and other features of the invention are explained in the following description, taken into account with the accompanying drawings, wherein.

DETAILED DESCRIPTION OF THE PREFERRED EMBODIMENT

In order to best illustrate the utility of the present invention, it is described in conjunction with a communication receiver, such as a paging receiver, capable of receiving and decoding transmitted information and notifying a user of the receipt of the transmitted information. While the present invention is described hereinafter with particular reference to a paging receiver, it is to be understood at the outset that the description which follows is contemplated the apparatus and method, in accordance with the present invention, may be used with numerous other communication receiving systems. These include, but are not limited to , cellular phones, portable two-way radios, or the like.

Figure 1:
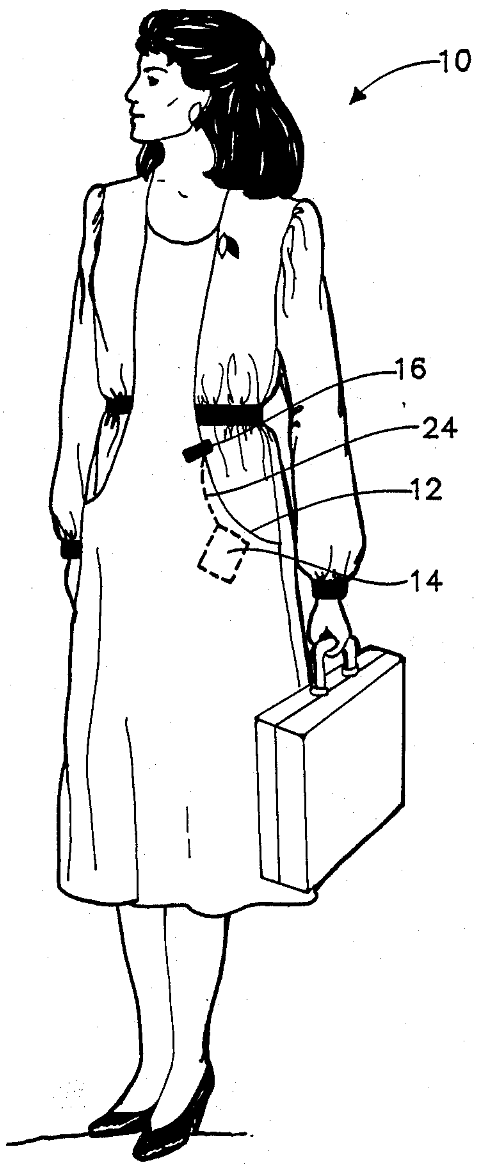
FIG. 1 is an illustration of the present invention being worn by a paging receiver user.

The paging receiver described herein is associated with a paging system having a base station terminal, responds to coded information from the base station terminal, and in turn provides an alert followed by messages to a paging receiver user during operation. With reference to FIG. 1, there is illustrated a paging receiver 14 being carried in a pocket 12 of the wearing apparel of a paging receiver user 10. An electrical connector cable 24 connects paging receiver 14 to an alerting device 16 which is attached to the user's apparel. In operation, the paging receiver 14 receives paging information from the base station terminal and in turn generates an electrical signal which is transmitted by cable 24 to the alerting device 16. The alerting device 16 responds to the electrical signal to generate an alert signal. The alerting device 16 includes an annunciation means such as a vibration means to generate an alert signal in the form of a sensible, tactile stimuli to user 10. The alerting device 16 may also include other numerous annunciation means such as illumination devices or audio devices to alert the paging receiver user.

As is evident from FIG. 1, the paging receiver 14 can be concealed in the apparel of the paging receiver user while the alerting device, being remotely separated from the paging receiver unit, generates a sensible alert to the paging receiver user. For example, the alerting device may take the form of a tie tac, brooch, lapel pin, or the like. In each case, the length of the connector cable 24 can be adjusted to insure the alerting device is fastening in the typical wearing apparel area for the form of the alerting device.

Figure 2:
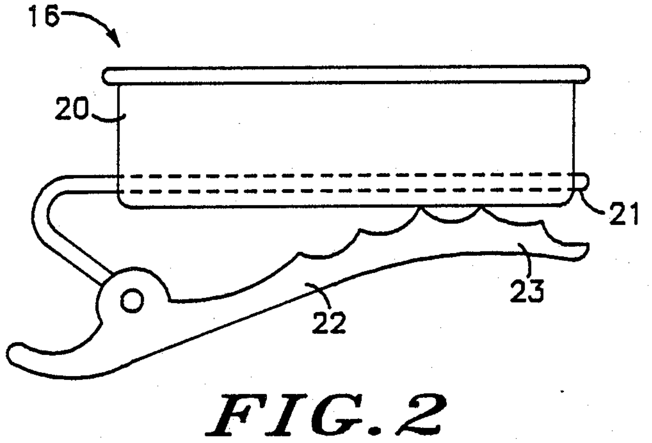
FIG. 2 shows one example of an alerting device used with the present invention showing a mounting clip arrangement.

Referring now to FIG. 2, there is shown an outside side view for the alerting device 16 for generating an alert signal (electrical connection not shown). The alerting device 16 is clipped to the apparel of the paging receiver user by a clip attachment means 22. The clip attachment means 22 includes a clip arm 23, a retention arm 21, and a resilient member (not shown) that urges the clip arm 23 forcibly against casing 20 to securely fasten the alerting device to appropriate apparel of the paging receiver user. Retention arm 21 attaches clip means 23 securely to housing 20. As is evident from FIG. 2, when the alerting device is clipped to the apparel, sensible, tactile stimuli in the form of vibration movement is transmitted to the user.

Figure 3:
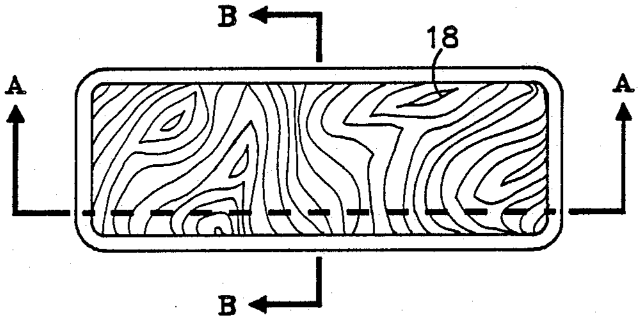
FIG. 3 illustrates the top view of the alerting device of the FIG. 2.

Turning now to FIG. 3, there is shown a top view of alerting device 16. The top view includes a cosmetic area 18 such as a jewel stone cosmetic treatment for a pleasant brooch-like visual effect of the alerting device. The cosmetic treatment of the top of the alerting device enhances the appealability and wearability for the paging receiver user.

Figure 4A:
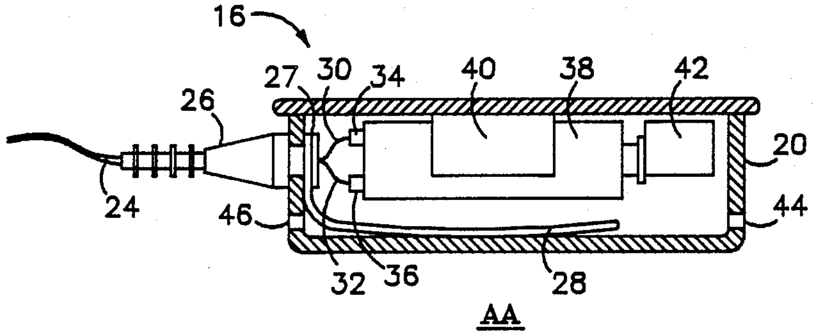
FIG. 4A shows a cut away section taken along line A—A of FIG. 3.

Turning now to FIG. 4A, there is shown a cut away section of the alerting device 16 along line A—A of FIG. 3. The alerting device 16 described herein is associated with an electric motor 38 and eccentric weight 42 attached to the shaft of motor 38 for generating a sensible tactile vibration in the alerting device 16. While the present invention is described hereinafter with particular reference to this type of annunciating device, it is to be understood at the outset of the description which follows it is contemplated that other annunciating devices, in accordance with the present invention, may be used. These include, but are not limited to, various illumination devices, sound devices, or odoriferous annunciating devices.

Figure 4B:
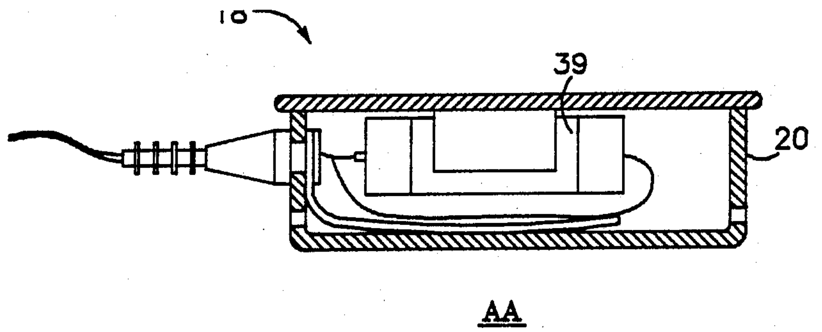
FIG. 4B shows a cut away section taken along line A—A of FIG. 3 for an illumination means.

Referring briefly to FIG. 4B, there is shown an illumination annunciating device such as incandescent light bulb 39. In this embodiment, the top cover 18 is translucent to externally transmit the light. A material suited for translucency is tourmaline.

Figure 4C:
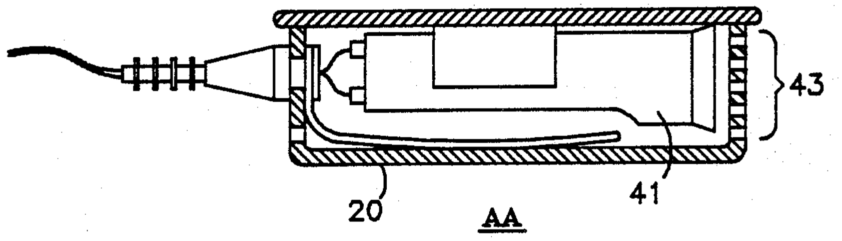
FIG. 4C shows a cut away section taken along line A—A of FIG. 3 for an audible means.

Turning briefly to FIG. 4C, there is shown an audible annunciating means such as a speaker 41. Ports 43 passing through casing 20 allow the external transmission of sound.

Continuing the explanation with reference to FIG. 4, casing 20 encloses the electric motor 38 and eccentric weight 42. A supporting mechanism such as snapping clip 40 securely fastens the motor 38 to the casing 20 to transfer the vibration motion of the rotating eccentric weight 42 to casing 20. The electric motor 38 further includes two electrical contacts 34 and 36 for energizing motor 38. Securely and electrically connected to contacts 34 and 36 are wires 30 and 32 which are further connected to a central conductor of connector cable 24 and to a conductor wire sheath of connector cable 24 respectively. Surrounding the termination of connector cable 24 into alerting device 16 is a molded strain relief housing 26 comprised of pliable material such as a resilient plastic or rubber compound. The housing 26 is molded around and bonded to the connector cable 24. A groove 27 molded into housing 26 provides a mechanical interlock between cable 24 and alerting device 16. In addition to providing a mechanical interlock, housing 26 protects wires 30 and 32 and provides strain relief for wires 30 and 32 to prevent separation from terminals 34 and 36.

Strain relief housing 26 is retained to casing 20 by a clip spring 28 which inserts into groove 27. In practice, retention arm 21 of apparel clip 22 is slidably positioned through apertures 46 and 44 to compress retainer spring 28 thereby providing a frictional lock of apparel clip 22 and housing 26 to casing 20. When apparel is clamped between casing 20 and clip 22, the vibratory motion produced by motor 38 and eccentric weight 42 is pronounceably transmitted to paging receiver user 10.

Figure 5:
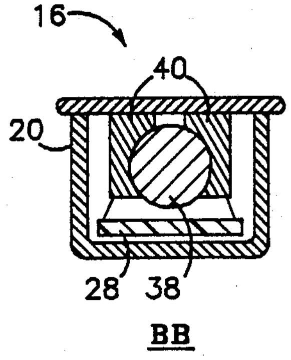
FIG. 5 shows a cut away section taken along line B—B of FIG. 3.

Referring now to FIG. 5, FIG. 5 is a cut away section of alerting device 16 taken along sectional lines B—B of FIG. 3. As shown, casing 20 encloses the motor 38 which is retained by snapping clip 40 which is an internal molded feature of top cover 18 of alerting device 16. Also shown is clip spring 28 which clamps retention arm 21 of apparel clip 22 to casing 20 to forcibly retain apparel clip 22 to the alerting device 16.

Figure 6:
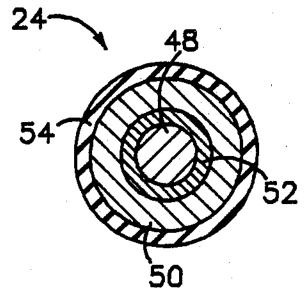
FIG. 6 is a cross sectional view of the connector cable.

Referring now to FIG. 6, there is shown a cross sectional area of the electrical connector cable 24. The connector cable 24 includes a central conductor 47, a conductive wire sheath 50, insulating material 52 surrounding central conductor 47 to insulate central conductor 47 from conductive wire sheath 50, and an outside insulating pliable material 54. The insulating pliable material 54 may be comprised of plastic or other material well known in the art for insulating electrical cables. The connector cable 24 terminates at a first end with an electrical connector to the paging receiver which is described hereinafter and terminates at the second end with the alerting device 16. The connector cable conductors provide electrical communication between electrical connector and the alerting device. Furthermore, cable 24 provides a mechanical connection between the alerting device 16 and the paging receiver 14.

Figure 7:
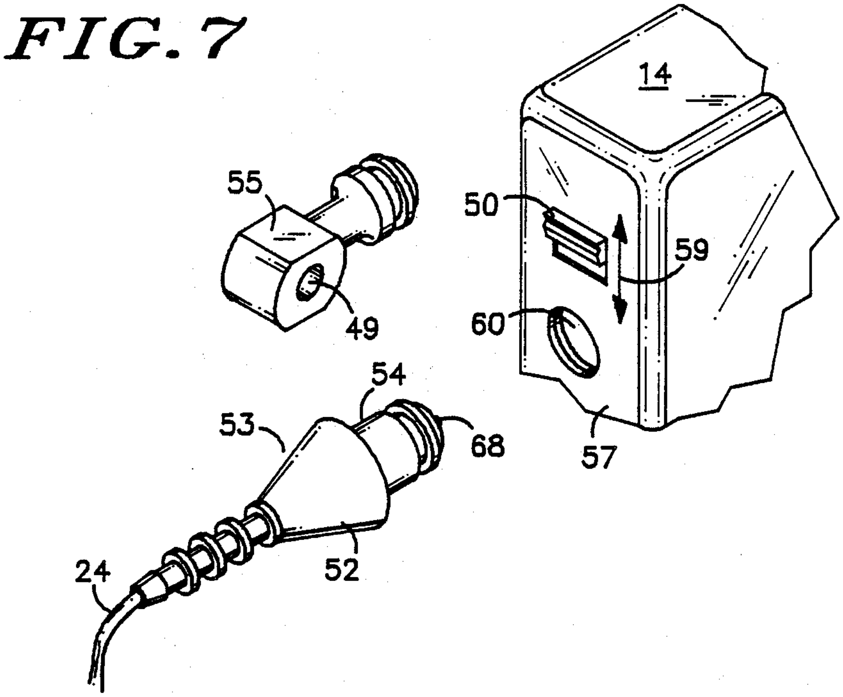
FIG. 7 illustrates a perspective view of the paging receiver showing the arrangement of the latching receptacle in the casing of the paging receiver.

Turning to FIG. 7, illustrated is connector cable 24 terminating at a first end with the electrical connector 53. Electrical connector 53 includes a mating plug 54 and a housing 52. The housing 52, comprised of a pliable material such as plastic, surrounds plug 54. The housing 52 provides insulation and also provides strain relief between the mating plug 54 and the cable 24. Mating plug 54, having an exposed distal end 68, inserts into socket 60 which is accessible from the outside of casing 57 of paging receiver 14. Socket 60, included in a latching receptacle 48, is described with reference to FIGS. 8–10. A lever 50 extends through casing 57 exposing a portion of lever 50 which can be manipulated by the user in the general directions as shown by arrow 59. The operation of lever 50 associated with mating plug 54 is described with reference to FIGS. 8 and 9.

Continuing the explanation with reference to FIG. 7, in practice, the mating plug 54 is inserted into socket 60. The latching mechanism associated with socket 60 allows mating plug 54 to be firmly inserted into socket 60 and firmly locked into place without interaction of lever 50. However, to release mating plug 54 from socket 60, lever 50 must be activated in a general downward direction with respect to FIG. 7 to release mating plug 54 from socket 60. The combination of the mating plug 54, socket 60, and lever 50 prevents the mating plug from accidentally separating from the paging device without interaction from the paging receiver user. Also shown in FIG. 7 is a plug 55 which also inserts and locks into socket 60. Plug 55 includes an aperture 49 for connecting a lanyard type chain, such as Motorola's NRN4916A, to the paging receiver. The mechanism for locking plug 55 into socket 60 is the same as for mating plug 54 and is explained in general with respect to FIGS. 8–12.

Figure 8:
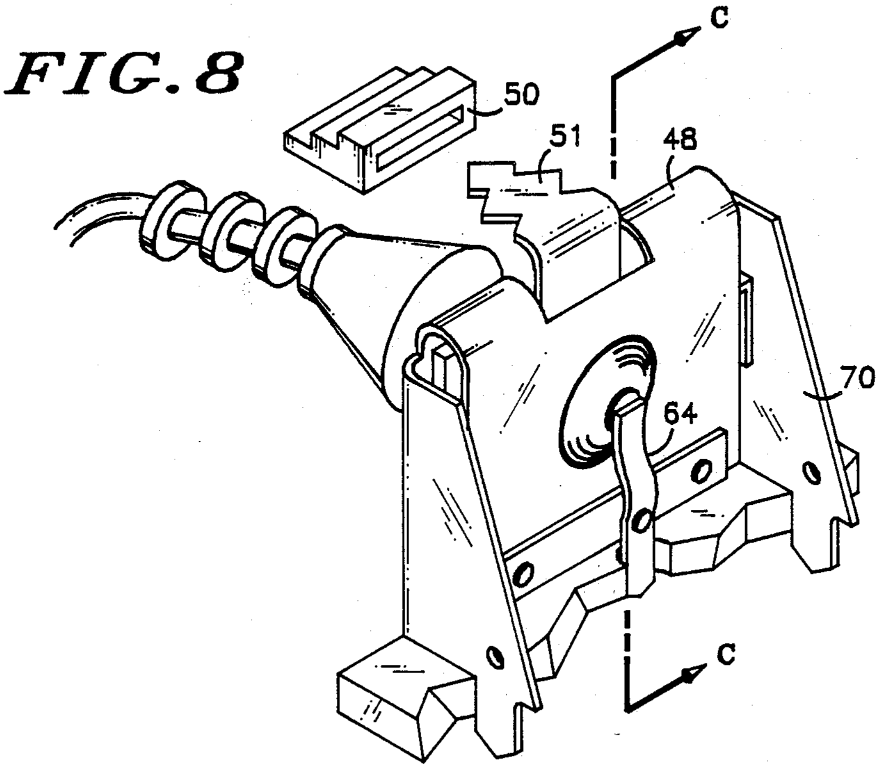
FIG. 8 is a perspective detailed illustration of a rear view of the latching receptacle and socket arrangement.
Figure 9:
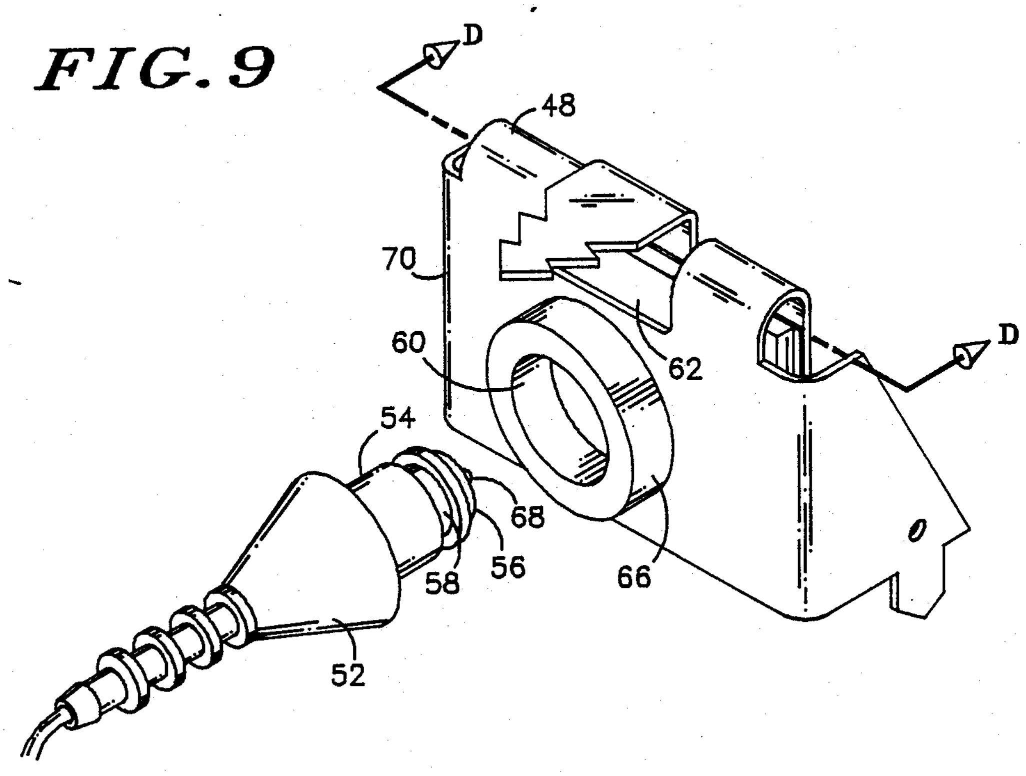
FIG. 9 is a perspective detailed front view of the socket and latching means taken along with the first electrical connector.

Referring now to FIGS. 8 and 9 in general, there is shown perspective views of latching receptacle 48 as installed in paging receiver 14. The latching receptacle 48 includes socket 60, bracket 70, and a locking means shown generally as 62. The lever 50 attaches to a lever arm 51 which is mechanically connected to locking means 62. Referring specifically to FIG. 8, there is illustrated a back perspective view of latching receptacle 48. Bracket 70 securely fastens latching receptacle 48 to the paging receiver casing 57. Disposed within socket 60 is a first socket contact 64 being electrically connected to the alert circuitry of paging receiver 14. A second socket contact comprised of a sleeve 66 has an inner surface which is urged into contact with the exposed outer surface of mating plug 54 when mating plug 54 is inserted into socket 60. Lever arm 51, when forced by lever 50 in the general downward direction 59 with reference to FIG. 7, effectively releases mating plug 54 from socket 60.

Referring to FIG. 9, there is shown a front perspective view of the mating plug 54 and latching receptacle 48. Mating plug 54 includes an annular groove 58 extending around the perimeter of the mating plug and positioned a predetermined distance along the longitudinal axis of the mating plug 54 as measured from distal end 68. The function of groove 58 is to lock mating plug 54 into socket 60 and to allow rotation of mating plug 54 relative to socket 60. This will become apparent with respect to the discussion of FIGS. 10–12. Also shown in FIG. 9, the insulation housing 52 may be disposed at an angle to the mating plug 54 so that the cord will generally extend to the paging device at right angles with casing 57 of the paging receiver.

Figure 10:
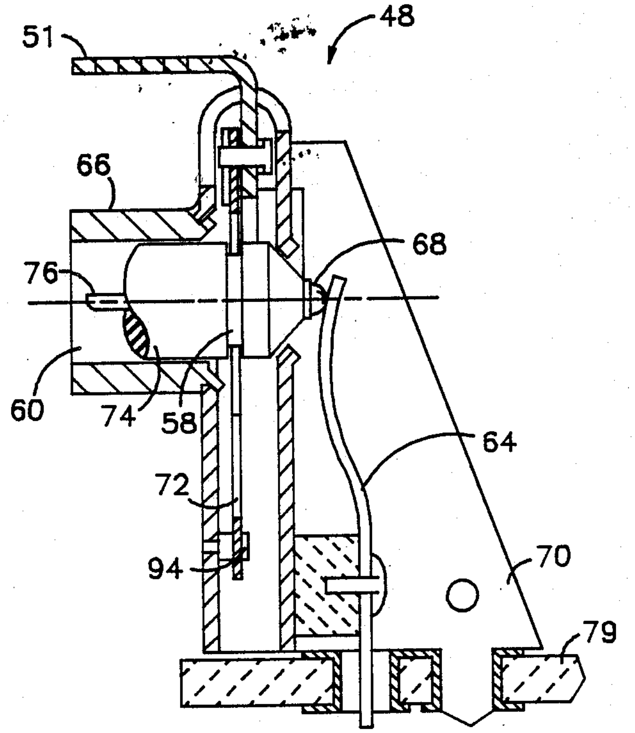
FIG. 10 illustrates a sectional view taken along line C—C of FIG. 8.

Referring to FIG. 10, there is shown a cut away view of latching receptacle 48 taken along section C—C of FIG. 8. The electrical contacts of mating plug 54 are comprised of an outer electrical conductor shaft 74 and an inner electrical conducting shaft 76. The first electrical contact is comprised of the outer shaft 74 enclosed by a portion of the insulation housing 52 and having a proximal end being electrically coupled to the conductive wire sheath of the connector cable. The second electrical contact of the mating plug is comprised of the inner shaft 76. The inner shaft 76 is surrounded by an appropriate insulating material which is enclosed by outer shaft 74. The inner shaft 76 has a proximal end being electrically coupled to the central conductor of the connector cable. Shafts 74 and 76 effectively provide electrical communication between the socket contacts and the cable conductors. The inner shaft 76 and outer shaft being concentric extend beyond the insulation housing 52 to expose a general cone-like portion at the distal end 68 to form mating plug 54.

As is evident in FIG. 10, the distal end 68 of the inner shaft 76 is urged into abutting relationship with the first socket contact comprised of a leaf spring member 64 during engagement between the mating plug 54 and the socket 60. The outer shaft 74 is urged into contact with the second socket contact comprised of the sleeve 66 during engagement between the mating plug 54 and the socket 60. A resilient means such as a pair of curved cantilever springs 72, attached to the latching receptacle with fastener 94, are normally biased to be urged into groove 58 when the mating plug 54 is inserted into socket 60. Since the cantilever springs 72 are normally biased to have an opening smaller than the diameter of outer shaft 74, the cone-like terminus of the distal end 68 of mating plug 54 forces the pair of cantilever springs 72 apart upon the mating plug being inserted into the socket 60. As mating plug 54 is inserted into socket 60, groove 58 aligns with springs 72, the springs 72 snap into groove 58, thus preventing any longitudinal movement of mating plug 54 while allowing rotational movement. As is evident, when springs 72 are urged into groove 58, mating plug 54 cannot be withdrawn from socket 60 without interaction from the user. Also shown in FIG. 10 is bracket 70 being firmly attached to a p.c. board 79 of paging receiver 14 for providing electrical communication to the alert circuitry included therein.

Figure 11:
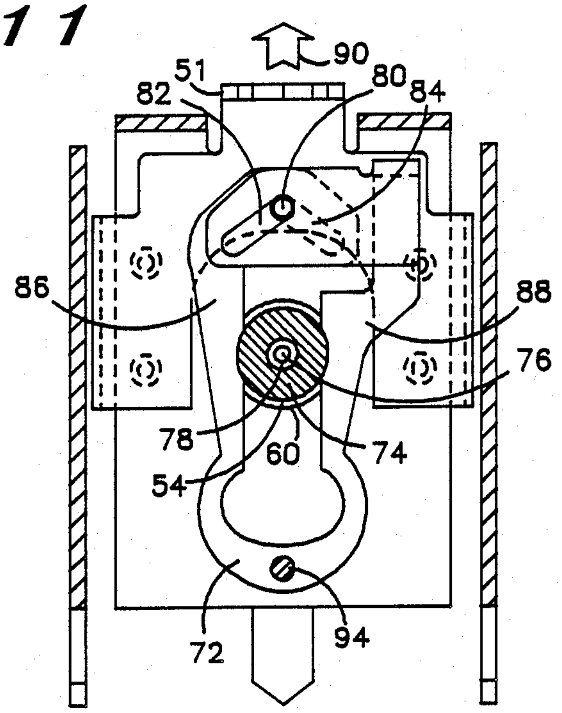
FIG. 11 illustrates a partial sectional view taken along line D—D of FIG. 9 with the mating plug engaged into the socket arrangement and being securely locked into the socket by the locking means.
Figure 12:
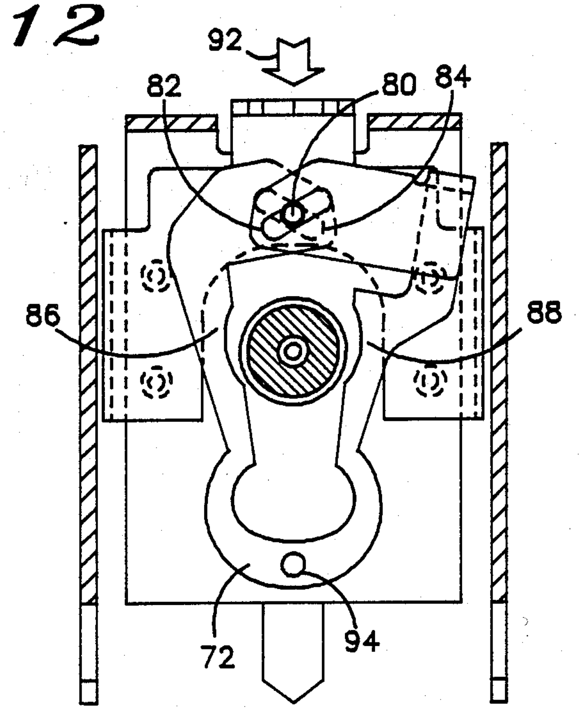
FIG. 12 illustrates a partial sectional view taken along line D—D of FIG. 9 with the mating plug being in a releasable position by actuating the locking means. Conceptually, the alerting device is connected at the end of an electrical cable. The alerting device includes a clip that allows it to be attached to any part of the paging receiver user's apparel. The opposite end of the cable includes an electrical connector in the form of a mating plug. The mating plug inserts into a corresponding socket included in the paging receiver. Inserting the mating plug into the socket actuates a locking means which locks the mating plug into the socket and prevents accidental separation. After locking the mating plug into the socket, the user can release the mating plug by actuating the locking means. Additionally, the mating plug swivels relative to the socket to prevent twisting in the cable.

FIGS. 11 and 12 show generally the operation for inserting the mating plug 54 into the socket 60 and the action of the locking means 62 to release the mating plug from socket 60. Referring specifically to FIG. 10, the resilient means is shown in the form of a pair of curved end cantilever springs 72 which are designed to be stressed about fastener 94. Upon insertion of mating plug 54 into socket 60, portions of the curved end cantilever springs 70, generally designated as 86 and 88, are forced apart by the cone like distal end 68 of mating plug 54. Upon further insertion of the mating plug 54 into the socket 60, the curved end cantilever springs 72 snap into and mate with groove 58. Further included in the top of curved end cantilever springs 72 are slots 82 and 84. Slot 82 is associated with and connected to spring portion 88, and slot 84 is associated with and connected to spring portion 86. In other words, when spring portion 86 and 88 are forced apart, slots 84 and 82 are respectively forced apart. As the portions 86 and 88 of the curved end cantilever springs 72 are forced apart, the arrangement of slots 82 and 84 being forced apart in each of the portions of the curved end cantilever springs forces pin 80 in the opposite direction as shown by arrow 90. Since pin 80 is mechanically coupled to lever arm 51, lever 50 is forced in the opposite direction of arrow 90. When spring portions 86 and 88 mate into groove 58, a noticeable snap occurs with a slight movement of lever 50 in the direction of arrow 90. The noticeable snap notifies the user that the mating plug 54 is securely locked into socket 60. The slots 82 and 84 are formed in a general diagonal direction to the movement 90 of lever arm 51 for effecting a sliding motion of pin 80 along the inner surfaces of slots 82 and 84. It is noted that pin 80 and slots 82 and 84 are arranged in the top end of curved end cantilever spring 72 for effecting a normally biased smaller opening between portions 86 and 88 than the diameter of mating plug 54. This is effected by having pin 80 normally at rest at the top end of slots 82 and 84. Referring further to FIG. 11, the formation of outer shaft 74 around inner shaft 76 and separated by insulating material 78 is clearly seen.

Referring now to FIG. 12, there is shown the operation of lever arm 51 for releasing mating plug 54 from socket 60. To release mating plug 54 from socket 60, lever arm 51 is forced in a general direction 92 forcing pin 80 in a similar direction. Slots 82 and 84, acting as cam followers, are forced to follow the direction 92 of pin 80 and translate the movement of pin 80 into lateral movement in the top curved end cantilever springs 72 which forces portions 86 and 88 apart. The lateral movement of portions 86 and 88 releases those portions of the curved end cantilever springs mated into groove 58, thus releasing mating plug 54.

As is evident from FIG. 12, the removal of portions 86 and 88 of the curved end cantilever springs 72 from the mating plug 54 allows the mating plug 54 to be easily slid from socket 60 to remove the cable connection from the paging receiver. Since the curved end cantilever springs are connected and stressed about fastener 94, upon removal of mating plug 54 and release of lever arm 51, the curved end cantilever springs 72 are normally biased to be forced together. As can be appreciated, when mating plug 54 is inserted into socket 60, the normally biased configuration of the curved portions 86 and 88 of the curved end cantilever springs securely locks the mating plug into the latching receptacle to prevent the mating plug from accidental separation from paging receiver 14 and because of the groove, the mating plug rotates completely while maintaining electrical communication.

Thus, there has been shown an apparatus and method for generating a remote signal for a paging receiver which includes a remote alerting device, a releasable electrical connector, a connector cable, and a latching receptacle for locking the removable electrical connector to the paging receiver. The removable electrical connector is able to rotate to prevent the connector cable from twisting and kinking. The connector cable terminates at one end with the alerting device and at the other end with the electrical connector. The connector cable mechanically and electrically couples the alerting device to the paging receiver. In operation, upon receiving a page in the paging receiver, the alerting circuitry in the paging receiver generates an electrical signal which is transmitted through the latching receptacle to the connector cable and to the alerting device to generate an alert signal in the alerting device.

The above described embodiment of the invention is illustrative only, and that modifications thereof may occur to those skilled in the art. Accordingly, this invention is not to be regarded as limited to the embodiment disclosed herein, but is to be limited as defined by the appended claims.

We claim:

1. An apparatus for generating a remote alert signal from a communication receiver, the communication receiver being enclosed in a casing and having alert circuitry for generating an electrical signal in response to a selective call message, said apparatus comprising:

a latching receptacle enclosed within said casing, said latching receptacle including a locking means and a socket, said socket being accessible from outside said casing, wherein said locking means includes a means for preventing said electrical connector from disengaging or accidentally separating from said socket and said socket includes a first socket contact and a second socket contact, said first and second socket contacts operatively coupled to the alert circuitry for transmitting the electrical signal;

a removable electrical connector for engaging said socket, said electrical connector including a first pair of electrical contacts, slidably engaging said first and second socket contacts to maintain electrical connection between said first pair of electrical contacts and said first and second socket contacts while permitting rotation of said electrical connector relative to said socket, and an insulation housing enclosing a portion of said first pair of electrical contacts, wherein one of said first pair of electrical contacts comprises an outer shaft enclosed by a portion of said insulation housing and insulated by said housing, and a second of said first pair of electrical contacts comprises an inner shaft concentric with and insulated from said outer shaft;

an alerting device for generating an alert signal in response to the electrical signal, said alerting device being remote from said communication receiver and including a second pair of electrical contacts for receiving said electrical signal; and a connector cable terminating at a first end with said electrical connector and terminating at a second end with said alerting device, said connector cable including a pair of cable conductors to provide electrical communication between said electrical connector and said alerting device, wherein the electrical signal being transmitted from the alert circuitry to said alerting device generates said alert signal;

wherein said electrical connector further comprises a means for preventing said connector cable from twisting and kinking, and wherein said outer shaft includes a proximal end being electrically coupled to one of said pair of cable conductors, and said inner shaft includes a proximal end being electrically coupled to a second of said pair of cable conductors, said inner shaft and said outer shaft extending beyond said insulation housing at a distal end to expose a generally cone-like portion to form a mating plug, and wherein said first socket contact further comprising a leaf spring member urged into abutting relation with the distal end of said inner shaft during engagement between said electrical connector and said socket, and said second socket contact further comprising a sleeve having an inner surface urged into contact with the exposed distal end of said outer shaft during engagement between said electrical connector and said socket.

2. The apparatus of claim 1 wherein said alerting device includes a vibration means for generating a tactile vibration.

3. The apparatus of claim 2 wherein said vibration means includes an electric motor being responsive to the electrical signal and having a shaft being coupled to an eccentric weight wherein said motor, upon being energized, rotates said eccentric weight to generate said tactile vibration.

4. The apparatus of claim 1 wherein said alerting device includes a speaker for generating an audible signal.

5. The apparatus of claim 1 wherein said alerting device includes an illumination device for generating an illuminating signal.

6. An apparatus for generating a remote alert signal from a communication receiver, the communication receiver being enclosed in a casing and having alert circuitry for generating an electrical signal in response to a selective call message, said apparatus comprising:

a latching receptacle enclosed within said casing, said latching receptacle including a locking means and a socket, said socket being accessible from outside said casing, wherein said locking means includes a means for preventing said electrical connector from disengaging or accidentally separating from said socket and said socket includes a pair of socket contacts, said pair of socket contacts operatively coupled to the alert circuitry for transmitting the electrical signal;

a removable electrical connector for engaging said socket, said electrical connector including a first pair of electrical contacts, slidably engaging said pair of socket contacts to maintain electrical connection between said first pair of electrical contacts and said pair of socket contacts while permitting rotation of said electrical connector relative to said socket, and an insulation housing enclosing a portion of said first pair of electrical contacts, wherein one of said first pair of electrical contacts comprises an outer shaft enclosed by a portion of said insulation housing and insulated by said housing, and a second of said first pair of electrical contacts comprises an inner shaft concentric along a longitudinal axis with and insulated from said outer shaft, and wherein the outer shaft includes an annular groove extending around said outer shaft and positioned a predetermined distance along the longitudinal axis from the distal end;

an alerting device for generating an alert signal in response to the electrical signal, said alerting device being remote from said communication receiver and including a second pair of electrical contacts for receiving said electrical signal; and a connector cable terminating at a first end with said electrical connector and terminating at a second end with said alerting device, said connector cable including a pair of cable conductors to provide electrical communication between said electrical connector and said alerting device, wherein the electrical signal being transmitted from the alert circuitry to said alerting device generates said alert signal;

wherein said removable electrical connector further comprises a means for preventing said connector cable from twisting and kinking, and wherein said outer shaft includes a proximal end being electrically coupled to one of said cable conductors, and said inner shaft includes a proximal end being electrically coupled to a second of said cable conductors, said inner shaft and said outer shaft extending beyond said insulation housing at a distal end to expose a generally cone-like portion to form a mating plug, and wherein the locking means further includes a resilient means and an actuating means, said resilient means being normally urged into said groove for preventing disengagement of said electrical connector from said socket, and said actuating means being engaged to force said resilient means from said groove to permit said electrical connector to disengage said socket.

7. The apparatus of claim 6 wherein said alerting device includes a vibration means for generating a tactile vibration.

8. The apparatus of claim 7 wherein said vibration means includes an electric motor being responsive to the electrical signal and having a shaft being coupled to an eccentric weight wherein said motor, upon being energized, rotates said eccentric weight to generate said tactile vibration.

9. The apparatus of claim 6 wherein said alerting device includes a speaker for generating an audible signal.

10. The apparatus of claim 6 wherein said alerting device includes an illumination device for generating an illuminating signal.

11. An apparatus for generating a remote alert signal from a communication receiver, the communication receiver being enclosed in a casing and having alert circuitry for generating an electrical signal in response to a selective call message, said apparatus comprising:

a latching receptacle enclosed within said casing, said latching receptacle including a socket and a locking means wherein said socket being accessible from outside the casing includes socket contacts operatively coupled to the alert circuitry for transmitting the electrical signal;

a removable electrical connector for engaging said socket, said electrical connector including first electrical contact slidably engaging said socket contacts to permit rotation of said electrical connector relative to said socket while maintaining electrical communication therebetween;

an alerting device for generating an alert signal in response to the electrical signal, said alerting device being remote from said communication receiver and including second electrical contacts for receiving the electrical signal;

a connector cable terminating at a first end with said electrical connector and terminating at a second end with said alerting device, said connector cable including cable conductors to provide electrical communication between said electrical connector and said alerting device, wherein the electrical signal being transmitted from the alert circuitry to said alerting device generates an alert signal, wherein said rotatable electrical connector prevents the cable from twisting and kinking, and further wherein said locking means prevents said electrical connector from accidentally separating from said socket;

said electrical connector comprising an insulation housing enclosing a portion of said first electrical contacts;

one of said first electrical contacts comprised of an outer shaft enclosed by a portion of said housing and being insulated by said housing, said outer shaft having a proximal end electrically coupled to one of said cable conductors; and a second of said first electrical contacts comprised of an inner shaft concentric width and insulated from said outer shaft, said inner shaft having a proximal end being electrically coupled to a second of said cable conductors, said inner shaft and said outer shaft further extending beyond said insulation housing to expose a generally cone-like portion at a distal end to form a mating plug, said outer shaft including an annular groove extending around said outer shaft and positioned at a predetermined distance along the longitudinal axis from said distal end;

said locking means including a resilient means and an actuating means, said resilient means being normally urged into said groove for preventing disengagement of said first electrical connector from said socket, and said actuating means being engaged to force said resilient means from said groove to permit said electrical connector to disengage said socket; and wherein said resilient means includes spring means forming a pair of curved end cantilevers being fastened and pivoted about a first end, each cantilever having overlapping slots on the second end, wherein the actuating means includes a pin extending through each slot and a lever, said pin being operatively connected to said lever, said lever effecting a movement in said pin wherein said slots, being forced to follow said pin, urge said cantilevers apart to disengage from said groove to release said electrical connector from said socket.

12. An apparatus for connecting a remote alerting device to a paging receiver, the paging receiver being enclosed in a casing and having alert circuitry for generating an electrical signal in response to a selective call message, the remote alerting device having an annunciation means being responsive to the electrical signal to generate an alert signal, said apparatus comprising:

a socket being enclosed within the casing and accessible from outside the casing, said socket including socket contacts operatively coupled to the alert circuitry for transmitting the electrical signal;

a connector cable including an electrical connector at a first end for engaging said socket, said electrical connector including first electrical contacts in the form of a mating plug for slidably engaging said socket contacts to permit rotation of said electrical connector relative to said socket while maintaining electrical communication therebetween, said mating plug including an annular groove extending around the periphery, said cable further terminating at the second end with the alerting device, wherein said cable includes cable conductors to provide electrical communication between the paging receiver and the alerting device by transmitting the electrical signal therebetween; and a locking means coupled to said socket, said locking means including a resilient means and an actuating means, wherein said resilient means being normally biased into said groove prevents said electrical connector from disengaging from said socket while permitting said electrical connector to rotate, and said actuating means being engaged for urging said resilient means from said groove to release said electrical connector.

13. The apparatus of claim 12 wherein said electrical connector comprises:

an insulation housing enclosing a portion of said first electrical contacts;

one of said first electrical contacts comprised of a therefore outer shaft enclosed by a portion of said housing, said outer shaft having a proximal end being electrically coupled to one of said cable conductors; and a second of said first electrical contacts comprised of an inner shaft surrounded by and insulated from said outer shaft, said inner shaft having a proximal end being electrically coupled to a second of said cable conductors, said inner shaft and said outer shaft further extending beyond said insulation housing to expose a generally cone-like portion at a distal end.

14. The apparatus of claim 13 wherein said cable conductors comprise:

a central conductor;

a conductive wire sheath being insulated from and surrounding said conductive wire sheath to electrically insulate said sheath; and wherein said central conductor is connected to said inner shaft and said conductive wire sheath is connected to said outer shaft.

15. The apparatus of claim 13 wherein said socket contacts includes:

a first socket contact comprised of a spring member urged into abutting relation with the distal end of said inner shaft during engagement between said electrical connector and said socket; and a second socket contact comprised of a sleeve having an inner surface urged into contact with the exposed distal end of said outer shaft during engagement between said electrical connector and said socket.

16. The apparatus of claim 12 wherein the alerting device includes an annunciating means for generating a tactile vibration in the alerting device.

17. The apparatus of claim 12 wherein the alerting device includes an annunciating device for generating an audible alert signal.

18. The apparatus of claim 12 wherein the alerting device includes annunciating device for generating an illuminating alert signal.

19. An apparatus for connecting the remote alerting device to a paging receiver, the paging receiver being enclosed in a casing and having alert circuitry for generating an electrical signal in response to a selective call message, the remote alerting device having an annunciation means being responsive to the electrical signal to generate an alert signal, said apparatus comprising:

a socket being enclosed within the casing and accessible from outside the casing, said socket including socket contacts operatively coupled to the alert circuitry for transmitting the electrical signal;

a connector cable including an electrical connector at a first end for engaging said socket, said electrical connector including first electrical contacts in the form of a mating plug for slidably engaging said socket contacts to permit rotation of said electrical connector relative to said socket while maintaining electrical communication therebetween, said mating plug including an annular groove extending around the periphery, said cable further terminating at the second end with the alerting device, wherein said cable includes cable conductors to provide electrical communication between the paging receiver and the alerting device by transmitting the electrical signal therebetween;

a locking means coupled to said socket, said locking means including a resilient means and an actuating means, wherein said resilient means being normally biased into said groove prevents said electrical connector from disengaging from said socket while permitting said electrical connector to rotate, and said actuating means being engaged for urging said resilient means from said groove to release said electrical connector; and said resilient means including spring means forming a pair of curved end cantilevers being fastened and pivoted about a first end, said cantilever springs normally biased to engage said groove, each cantilever having overlapping slots on the second end, wherein the actuating means includes a pin extending through each slot and a lever, said pin being operatively connected to said lever, said lever effecting a movement in said pin wherein said slots, being forced to follow said pin, urge said cantilevers apart to disengage from said groove to release said electrical connector.

* * * * *